(No Model.)

C. REINHARDT.
CANDLE HOLDER FOR CHRISTMAS TREES.

No. 395,514. Patented Jan. 1, 1889.

WITNESSES: C. R. Bennett, H. S. Reeve

INVENTOR Christopher Reinhardt, BY ATT'YS.

UNITED STATES PATENT OFFICE.

CHRISTOPH REINHARDT, OF NEWARK, NEW JERSEY.

CANDLE-HOLDER FOR CHRISTMAS-TREES.

SPECIFICATION forming part of Letters Patent No. 395,514, dated January 1, 1889.

Application filed September 20, 1887. Serial No. 250,195. (No model.)

*To all whom it may concern:*

Be it known that I, CHRISTOPH REINHARDT, a citizen of the United States, residing at Newark, in the county of Essex and State of New Jersey, have invented certain new and useful Improvements in Candle-Holders for Christmas-Trees; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a candle-holder adapted to be secured to the limbs of Christmas-trees, one of reduced cost and simplicity of construction; and it consists in the improved candle-holder having the arrangements and combinations of parts, such as will be hereinafter set forth, and finally embodied in the clauses of the claim.

Figure 1:
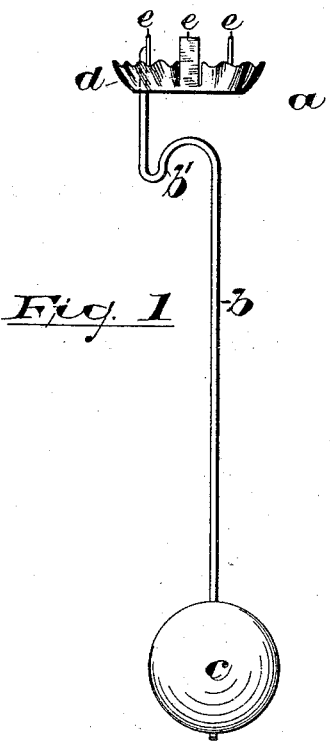
Figure 2:
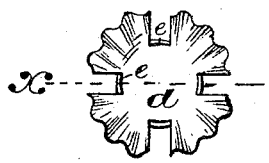

Referring to the accompanying drawings, in which like letters indicate corresponding parts in each of the figures of the drawings, Figure 1 is an elevation of a candle-holder. Fig. 2 is a plan of the bowl thereof; and Fig. 3 is a sectional view taken through line X, showing the said holder when the same is provided with a tack for securing the bowl to the tree in lieu of the hook and weighted stem, as shown in Fig. 1.

Figure 3:

In said drawings, $a$ indicates a bowl adapted to receive the lower end or base of the candle, the edges of which are upwardly turned, as indicated in Figs. 1 and 3, to receive the drippings from the candle and prevent the same from dropping directly upon the floor or tree or on the articles placed thereon. Said bowl is adapted to be secured upon the tree in any suitable manner, though I prefer to provide the same with a weighted stem, $b$, having a hook, $b'$, adapted to catch upon the limb of the tree. The weight $c$ of said stem may be secured thereon in any ordinary manner. In lieu of the weighted stem I may provide the bowl with a stem in the form of a tack, as $b^2$ in Fig. 3, said tack being preferably soldered to the under side of the bowl. By this construction the said bowl may be secured more rigidly upon the tree. The bowl is preferably of sheet-tin, and has heretofore had the upwardly-extending fingers soldered thereon.

To reduce the cost of construction and to provide means for holding the candle upon the bowl, that are more perfectly connected with said bowl, I strike in suitable dies the said holding means directly from the material of said bowl, as shown in the figures of the drawings. By striking up the holding-fingers $e\ e$ from the material of the bowl the cost of construction is very much reduced, quantities considered, and the soldering processes employed in construction heretofore are dispensed with. The said fingers are integral with the said bowl, and said bowl and fingers together form a socket or receptacle for the base of the candle.

I may, as in Fig. 1, solder the upper extremity of the stem against one of the fingers, by which construction it is unnecessary to bend the upper extremity of the stem to solder it to the bowl to provide a suitable bearing.

Having thus described the invention, what I claim as new is—

The combination, with a stem of a candle-holder, bent as described, of a sheet-metal plate having its outer portion divided by radial cuts into sections $a$ and $e$ and bent upward, as shown, the central portion of said plate being formed into a drip-bowl and the sections $e$ into a candle-holder, as described, for the purposes set forth.

In testimony that I claim the foregoing I have hereunto set my hand this 15th day of September, 1887.

CHRISTOPH REINHARDT.

Witnesses:
OLIVER DRAKE,
CONSTANCE H. BALDWIN.